A. RAUSCH.
ELECTRIC HOIST.
APPLICATION FILED MAR. 2, 1910.

967,237.

Patented Aug. 16, 1910.

Witnesses:

Inventor
August Rausch,
by
His Attorney.

UNITED STATES PATENT OFFICE.

AUGUST RAUSCH, OF BERLIN, GERMANY, ASSIGNOR TO GENERAL ELECTRIC COMPANY, A CORPORATION OF NEW YORK.

ELECTRIC HOIST.

967,237.  Specification of Letters Patent.  Patented Aug. 16, 1910.

Application filed March 2, 1910. Serial No. 546,807.

*To all whom it may concern:*

Be it known that I, AUGUST RAUSCH, a subject of the King of Prussia, residing at Berlin, Germany, have invented certain new and useful Improvements in Electric Hoists, of which the following is a specification.

My invention relates to electrically operated hoists and is more especially applicable to electric hoists driven by alternating current motors, and its object is to increase the reliability of the control in lowering heavy loads.

In hoists operated by direct current motors in which the driving gear is such that the motor may be driven backward by the load in lowering, the armature circuit of the motor may be closed upon itself through resistances for lowering heavy loads, so that the motor runs as a generator and thereby exerts a braking effect which may be regulated by cutting resistance in or out. With alternating current motors of the induction type a braking effect is not obtained until the motor runs above synchronism, since only then can the machine act as a generator returning current to the line. For speeds below synchronism electric braking can be effected only by connecting the motor as for hoisting and thus causing it to oppose the torque produced by the downward moving load. In hoists of high efficiency, the current supplied to the motor with these connections must be comparatively high if the load is heavy, in order that an abrupt descent of the load may be prevented, but if the controller is arranged to supply this comparatively high current to the motor in its braking positions, then when the hoist is unloaded or carrying a light load the motor when connected for braking will raise the load instead of letting it move downward. In this way trouble may readily arise unless the operator gives close attention to the hoist and operates the controller quickly enough to prevent the controller from lifting the light load. By my invention I do away with this difficulty in a control of the character described above.

My invention consists in providing, in addition to the ordinary controller for the motor, means operative upon a movement of the motor in a hoisting direction when the controller is in a braking position for automatically stopping the hoisting movement.

My invention will best be understood by reference to the accompanying drawing, in which—

Figure 1:
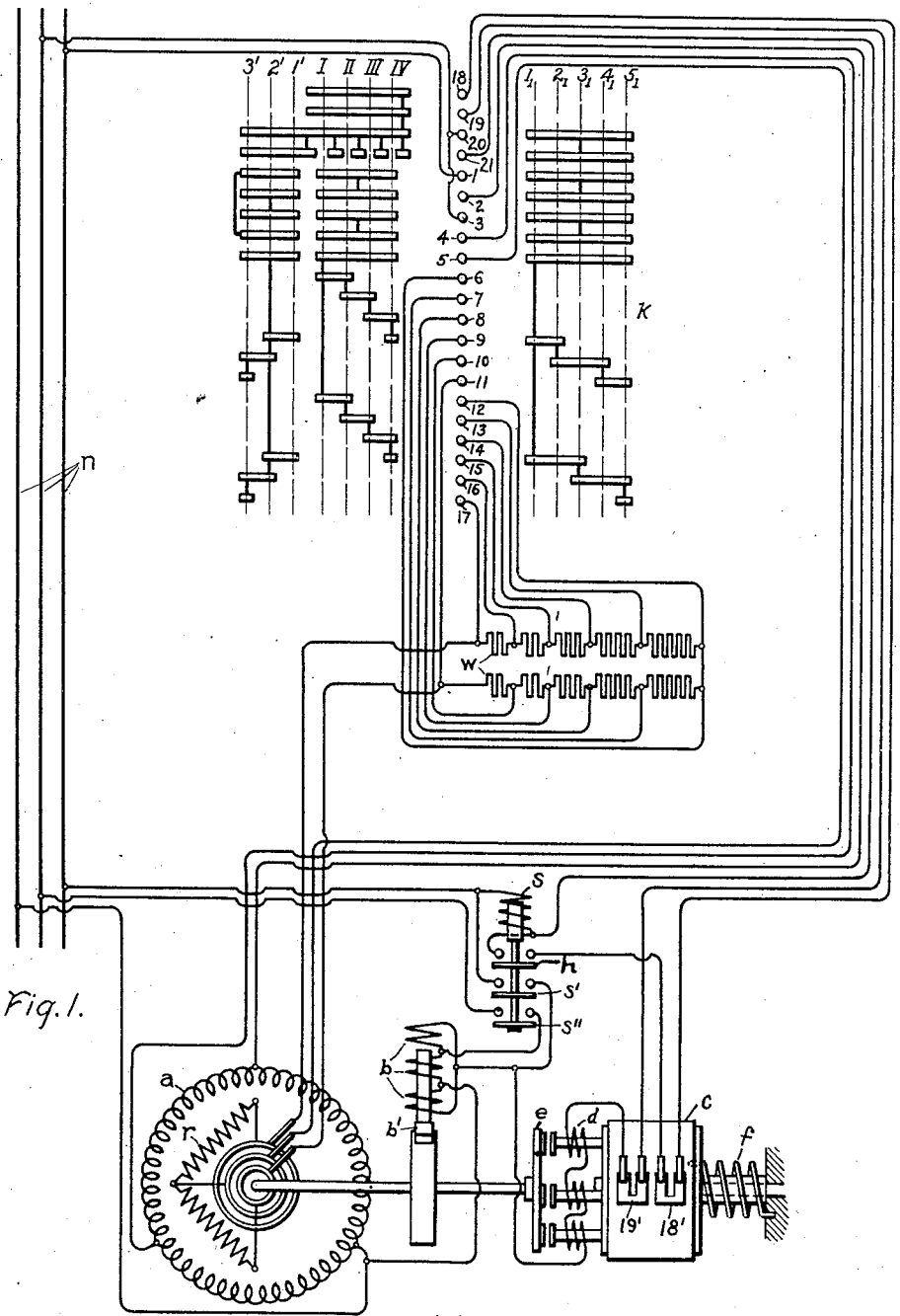
Figure 2:
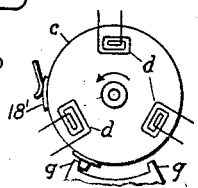

Figure 1 shows diagrammatically a motor and control system therefor arranged in accordance with my invention, and Fig. 2 shows a detail of the magnetic coupling employed in Fig. 1.

In the drawings, $n$ represents the three leads of a three-phase system, $a$ the stator or primary winding of the motor and $r$ its secondary winding, which is indicated as two-phase and provided with collector rings.

$w$ is the starting and regulating resistance connected to the rotor winding through the collector rings.

$k$ is the controller, which is shown diagrammatically with its contacts developed on a plane surface, having five lifting positions indicated by dotted lines $1_1$ to $5_1$, braking positions I to IV for lowering heavy loads, and positions $1^1$ to $3^1$ for lighter loads. The controller has 21 contact fingers, of which 1 to 17 carry the motor current and 18 to 21 control certain magnet windings. Contact fingers 1 to 4 serve for connecting two terminals of the stator winding $a$ to the two right-hand leads $n$; the third stator terminal is connected directly to the left-hand lead. In the hoisting positions, a relay winding $s$ is energized through contact fingers 21 and 20 of the controller. This relay winding is provided with three contacts, of which the contact $s'$ and $s''$ control the circuit of the windings $b$ of a three-phase magnet controlling a friction brake $b^1$ on the motor shaft. Thus, when the controller $k$ is in any one of its hoisting positions, the relay $s$ is energized, the brake winding $b$ is energized, and the brake is lifted. This is true not only of the hoisting positions $1_1$ to $5_1$, but also of the lowering positions $1^1$, $2^1$ and $3^1$ for light loads, in which the motor is connected to the line $n$, but with two of its terminals reversed, so that the motor drives the load downward. In the off position of the controller, which is the position shown in the drawing, the motor circuit is broken, the relay $s$ is deënergized and the brake magnet $b$ is deënergized, so that the brake is applied and the load is held stationary.

For hoisting, the controller is moved first to the position $1_1$, in which the stator winding is connected to the line, and the brake lifted, as heretofore explained, and at the same time the rotor circuit is closed through contacts 5, 9 and 15 and a portion of the resistance $w$. As the controller is moved to its other hoisting positions the portions of resistances $w$ in circuit are cut out step by step until in position $5_1$ the rotor winding is directly short-circuited.

For braking control in lowering, in which the load is to be braked by connecting the motor as for hoisting, a device $c$ comes into play. This consists of a small switch cylinder with two movable contacts $18^1$ and $19^1$. The cylinder is rotatable between two stops $g$, shown in Fig. 2, and is normally held in the position shown by means of a spring $f$, in which position its contacts bridge the fixed contact fingers, as shown in Fig. 1. Between the switch cylinder and the motor or any other suitable part of the driving mechanism of the hoist, is provided an electromagnetic coupling. This coupling consists of a movable part $e$ connected to the motor or driving mechanism and a part connected to the switch cylinder $c$ which may be excited by means of magnet coils $d$. When the coils are excited and the member $e$ is rotating, there exists between the two parts of the coupling a torque which, in case the motor rotates in a hoisting direction, that is, in the direction of the arrow in Fig. 2, rotates the switch cylinder $c$ to open the circuits of its contacts. As soon as the excitation of the magnet windings $d$ ceases, the contact cylinder $c$ is brought back into its normal position by the spring $f$.

The method of operation of this device is as follows: If heavy loads are to be braked with the motor connected as in hoisting, the contact cylinder of the controller $k$ is rotated to the position IV. In passing from off position to this position, the circuit of the relay $s$ is closed momentarily at contact fingers 21 and 20 in the same manner as in the hoisting positions, and, therefore, the brake magnet is excited. When position IV is reached, the circuit of contacts 21 and 20 is opened, but the relay $s$ does not fall, since it has closed a maintaining circuit for itself through its auxiliary contact $h$, and contact $18^1$ of switch $c$, and contacts 18 and 20 of the controller $k$. The relay $s$ remains energized, therefore, and the brake lifted. The coils $d$ of the magnetic coupling are also energized by a circuit passing through contacts $s^1$ of relay $s$, the coils $d$ in series, contact $19^1$ of switch $c$, and contacts 19 and 20 of controller $k$. The stator of the motor is connected to the line and its rotor to the resistances $w$ precisely as in hoisting position $1_1$. If the torque exerted by the load is greater than that exerted by the motor, the load will slowly descend opposed by the motor torque; but if in this position IV of the controller the hoisting torque of the motor is greater than the torque exerted by the load, tending to pull the motor backward, the motor will move in a hoisting direction. In this case the torque which is exerted on the switch $c$ through the magnetic coupling rotates it in the direction indicated by the arrow in Fig. 2, so that the circuit of the relay $s$ is broken at contact $18^1$. The relay $s$, consequently, drops its contacts and interrupts the current for the brake magnet $b$, so that the brake falls into engagement and holds the hoist stationary. By the movement of the switch $c$ into its open-circuit position the exciting circuit for the magnetic coupling is also broken at contact $19^1$, so that the spring $f$ returns the switch cylinder $c$ again to its normal position and thereby puts it into condition to repeat its operation, if necessary, when the controller $k$ is moved to another position. It will be noted that relay $s$ having been deënergized it can be energized again only by moving the controller from position IV to off position, or to position III. In position III the brake is again lifted and the same conditions exist as in IV, except that the hoisting torque of the motor is now decreased, since more of resistances $w$ are included in the circuit of the rotor winding. If the hoisting torque is still too great, the same cutting out operation is repeated in this position as in position IV. In the other case, when the torque of the load exceeds that of the motor, the motor moves in a lowering direction while the switch cylinder $c$ remains at rest, since the left-hand stop $g$ in Fig. 2 prevents its movement, and the brake remains lifted. The load can be accelerated by shifting the controller to positions II and I successively, in which positions the amount of the resistance $w$ in circuit with the rotor is further increased and the motor torque, consequently, reduced. If the hoist were unloaded or had a very light load, the switch $c$ would come into operation on each one of the braking positions IV to I. It would then be necessary to move the controller to the position $1^1$, in which the same connections are established as in the hoisting position $1_1$, except that two of the motor leads are reversed at contacts 1 to 4. The motor now operates in a lowering direction positively driving the load downward. The load may be further accelerated by moving to the positions $2^1$ and $3^1$, in which portions of the resistances $w$ are successively cut out of circuit.

It will be obvious to those skilled in the art that my invention may be embodied in many forms differing from that which is diagrammatically illustrated, and I accordingly do not desire to limit myself to the particular construction and arrangement of parts shown and described, but aim in the appended claims to cover all modifications which are within the scope of my invention.

What I claim as new and desire to secure by Letters Patent of the United States, is,—

1. In an electrically operated hoist, in combination with the driving motor, a controller for the motor having a braking position for lowering in which the motor is connected to the line as for hoisting to cause the motor to act as a braking generator driven by the load, and means operative upon a movement of the motor in a hoisting direction when the controller is in said position for automatically stopping the hoisting movement.

2. In an electrically operated hoist, in combination with the driving motor, a controller for the motor having a braking position for lowering in which the motor is connected to the line as for hoisting to cause the motor to act as a braking generator driven by the load, a brake for the motor, and means operative upon a movement of the motor in a hoisting direction when the controller is in said position for automatically applying said brake.

3. In an electrically operated hoist, in combination with the driving motor, a controller for the motor having a braking position for lowering in which the motor is connected to the line as for hoisting to cause the motor to act as a braking generator driven by the load, a switch operative upon a hoisting movement of the motor when the controller is in said position, and means for stopping the hoisting movement controlled jointly by said controller and said switch.

4. In an electrically operated hoist, in combination with the driving motor, a controller for the motor having a braking position for lowering in which the motor is connected to the line as for hoisting to cause the motor to act as a braking generator driven by the load, a switch operative upon a hoisting movement of the motor when the controller is in said position, a magnet winding controlled jointly by said controller and said switch, and a brake for the motor controlled by said magnet winding.

5. In an electrically operated hoist, in combination with the driving motor, a controller for the motor having a braking position for lowering in which the motor is connected to the line as for hoisting to cause the motor to act as a braking generator driven by the load, a switch member, driving connections between said switch and said motor operative upon a hoisting movement of said motor when said controller is in said position, a magnet winding controlled by said switch member, and means for stopping the hoisting movement controlled by said magnet winding.

6. In an electrically operated hoist, in combination with the driving motor, a controller for the motor having a braking position for lowering in which the motor is connected to the line as for hoisting to cause the motor to act as a braking generator driven by the load, a normally stationary member, a magnetic coupling between said motor and said member controlled by said controller when in said braking position, said member being restrained from movement when the motor is moving in the lowering direction but free to move when driven by the motor in the hoisting direction, and means for stopping the hoisting movement controlled by said member.

7. In an electrically operated hoist, in combination with the driving motor, a controller for the motor having a plurality of braking positions in which the motor is connected to the line as for hoisting with different amounts of torque so as to act in different degrees as a braking generator driven by the load, a magnet winding, contacts operative on the movement of said controller to any of said braking positions for momentarily energizing said magnet winding, said magnet winding being provided with contacts for maintaining its own circuit, means operative upon a hoisting movement of the motor when said controller is in any of said positions for opening automatically the maintaining circuit of said magnet winding, and means controlled by said magnet winding for stopping the hoisting movement.

In witness whereof, I have hereunto set my hand this 7th day of February, 1910.

AUGUST RAUSCH.

Witnesses:
LEOPOLD JANISCH,
FRIEDRICH EICHBERG.